United States Patent
Horie et al.

(10) Patent No.: US 11,416,390 B2
(45) Date of Patent: Aug. 16, 2022

(54) TRI-COLOR BITMAP ARRAY FOR GARBAGE COLLECTION

(71) Applicant: International Business Machines Corporation, Armonk, NY (US)

(72) Inventors: Michihiro Horie, Ageo (JP); Kazunori Ogata, Soka (JP)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 17/015,324

(22) Filed: Sep. 9, 2020

(65) Prior Publication Data

US 2022/0075720 A1 Mar. 10, 2022

(51) Int. Cl.
| | |
|---|---|
| G06F 12/02 | (2006.01) |
| G06F 9/355 | (2018.01) |
| G06F 9/30 | (2018.01) |
| G06F 12/0873 | (2016.01) |

(52) U.S. Cl.
CPC ...... *G06F 12/0253* (2013.01); *G06F 9/30021* (2013.01); *G06F 9/355* (2013.01); *G06F 12/0238* (2013.01); *G06F 12/0873* (2013.01)

(58) Field of Classification Search
CPC .. G06F 9/30021; G06F 9/355; G06F 12/0238; G06F 12/0253; G06F 12/0873
See application file for complete search history.

(56) References Cited

U.S. PATENT DOCUMENTS

| | | | |
|---|---|---|---|
| 6,874,074 B1 * | 3/2005 | Burton | G06F 12/0269 |
| | | | 707/999.202 |
| 7,783,681 B1 | 8/2010 | Delsart | |
| 8,335,806 B2 * | 12/2012 | Schatzl | G06F 16/00 |
| | | | 707/813 |
| 10,261,898 B1 * | 4/2019 | Payer | G06F 12/0269 |
| 2005/0114413 A1 | 5/2005 | Subramoney et al. | |
| 2005/0198088 A1 * | 9/2005 | Subramoney | G06F 16/2308 |
| 2007/0022149 A1 | 1/2007 | Bacon et al. | |
| 2007/0100919 A1 * | 5/2007 | Lee | G06F 12/0276 |
| 2007/0255909 A1 | 11/2007 | Gschwind et al. | |
| 2010/0223429 A1 | 9/2010 | Cher et al. | |
| 2017/0344473 A1 * | 11/2017 | Gidra | G06F 12/0261 |
| 2019/0095323 A1 * | 3/2019 | Gidra | G06F 12/0269 |

FOREIGN PATENT DOCUMENTS

| | | |
|---|---|---|
| CN | 102722447 A | 10/2012 |
| CN | 103080908 A | 5/2013 |

OTHER PUBLICATIONS

Domani et al., "Implementing an On-the-fly Garbage Collector for Java," ACM SIGPLAM, Oct. 2000, 12 pages https://dl.acm.Org/doi/abs/10.1145/362426.362484.

* cited by examiner

*Primary Examiner* — Aracelis Ruiz (74) *Attorney, Agent, or Firm* — Peter J. Edwards (57) ABSTRACT

A first object at a memory address is identified. A first index location in a bitmap that corresponds to that memory address is calculated. A bit is set at the first index location. A pointer to a child object within the first object is detected. A memory address of that child object is identified using the pointer. A second index location in the bitmap that corresponds to that memory address is calculated. A bit is set at the second index location. A bit is also set at a third index location, which is adjacent to the first index location.

20 Claims, 6 Drawing Sheets

TRI-COLOR BITMAP ARRAY FOR GARBAGE COLLECTION

BACKGROUND

The present disclosure relates to garbage collection in computer systems, and more specifically, to marking unreachable resources for garbage collection.

Some computer systems load resources into memory when a program requires that resource to complete a function. These resources may be identified by a pointer within the program (e.g., within another resource used by that program) that identifies the resources and their locations.

Some computer systems occasionally perform garbage collection to free up memory that is used by resources that are no longer needed by the computer system (e.g., resources that have been loaded into memory but are no longer in use by the programs that originally required them). For this reason, garbage collection often includes methods to identify those unneeded resources. Some methods include tracking the pointers between resources to determine whether any resource in memory is not being pointed to by a program or other resource that is currently in use.

SUMMARY

Some embodiments of the present disclosure can be illustrated as a method comprising identifying a first object at a first memory address. The method may also comprise calculating a first index location in a bitmap. The first index location may correspond to the first memory address. The method may also comprise setting a first bit at the first index location. The method may also comprise detecting a pointer to a child object within the first object. The method may also comprise identifying, using the pointer, a second memory address of the child object. The method may also comprise calculating a second index location in the bitmap. The second index location may correspond to the second memory address. The method may also comprise setting a second bit at the second index location. The method may also comprise setting a third bit at a third index location. The third index location may be adjacent to the first index location.

Some embodiments of the present disclosure can also be illustrated as a system comprising a processor and a memory. The memory may be in communication with the processor and contain program instructions that, when executed by the processor, are configured to cause the processor to perform the above method.

Some embodiments of the present disclosure can also be illustrated as a computer program product that comprises a program readable storage medium. The computer readable storage medium may have computer instructions embodied therewith. These program instructions may be executable by a computer to cause the computer to perform the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to garbage collection in computer systems, more particular aspects relate to marking unreachable resources for garbage collection. While the present disclosure is not necessarily limited to such applications, various aspects of the disclosure may be appreciated through a discussion of various examples using this context.

Typical computer systems store resources (also referred to herein as "objects") in memory as those resources are required by processes running on those computer systems, either in development or in real time use. As a program that has requested a resource changes, or as the use of the program changes, a resource that was once necessary for the operation of the program may become unnecessary. Removal of the resources that are unnecessarily utilizing system memory can cause the system to operate faster and more smoothly. For this reason, many computer systems incorporate a form of garbage collection that is designed to delete, from memory, resources that are no longer required by the computer system. However, in order for garbage-collection methods to effectively delete those resources, the resources that are no longer necessary must be identified.

In some computer systems, unneeded resources can be identified based on whether any other resources in memory refer to those unneeded resources. For example, many computer systems track resources with the use of "pointers." A pointer, as used herein, refers to a reference in a resource that identifies another resource and provides its location. Pointers are used by resources to identify one or more of the resources that a computer system may need to use while or after utilizing that first resource. When a resource in memory is identified by a pointer in a resource that can itself be traced back to a root resource (e.g., an object that is initially loaded upon running a program or process), that object is said to be "reachable." Any object for which this is not true is said to be unreachable.

Unreachable objects in memory occupy memory space without providing any benefit to the computer system. Because they are unreachable, no program is able to use the object. Thus, it is beneficial to identify and remove unreachable resources from memory. Some computer systems utilize garbage collection to free up memory that is dedicated to unreachable objects. Garbage collection typically includes analysis of pointers between objects to determine a list of objects that are reachable, followed by deleting objects that are not listed.

For example, some garbage-collection methods begin by identifying what are referred to as root objects of a system or process. Root objects, as used herein, typically take the form of the first objects loaded by a system in a particular process or program. Root objects are typically stored in a structured section of memory that provides quick and reliable access to the root objects by the computer system. They may be, for example, in a memory stack or other section of organized memory. This quick and reliable access, as well as the fact that root objects are the base objects loaded by a system for a process, makes root objects reachable by definition.

Root objects often contain pointers to other objects that are required to perform a process after a root object has been loaded. For example, the resource objects for a process may include linked-list items that, in order for the process to run, are required to be used in order. In a linked list, each storage object contains a pointer to the location of the next object in the list. Thus, at the root of the list, a root object would contain a pointer to the next object in the linked list.

As used herein, a first object (e.g., a root object) that contains a pointer to a second object is referred to herein as a "parent" or "parent object" with respect to that second object. The second object, on the other hand, is referred to as that parent's "child" or "child object." If second object also contains a pointer to a third object, the second object is also referred to as the third object's parent, and the third object is referred to as the second object's child. Further, the first object is referred to as the third object's "grandparent" or "grandparent object," while the third object is referred to as the first object's "grandchild" or "grandchild object." Collectively, the children, grandchildren, and so on, of an object may be referred to herein as that object's "descendants" or "descendant objects."

In many memory systems, while root objects are stored in a heavily organized section of memory (e.g., stack memory), descendant objects are often stored in a less organized, less managed, free floating section of memory (e.g., heap memory). This unorganized memory is typically larger and more flexible than the organized section of memory, but locating objects within it is more difficult without directions. For this reason, pointers to an object typically contain information that either provides or enables the calculation of the object's address in this unorganized section of memory. In other words, by analyzing the pointer to a child object within the parent object, the memory location of that child object can be determined.

It follows, then, that any descendant object of a root object is also reachable through the series of pointers that connect the root object to that descendant. Similarly, any object that is not a descendant of a root object is not reachable. Thus, many garbage collection systems identify objects to be purged from memory by identifying the descendants of root objects. A typical garbage-collection system may, for example, begin by identifying a root object (for example, in the memory stack) and marking it as "reachable." The system may then analyze the root object for pointers to other objects (i.e., the root object's children). Upon discovering a pointer to a child object, a typical system performing garbage collection may then identify the location of that child object in memory, and record that an object at that memory location is "reachable" in the system's memory management system. By analyzing the pointers of the root object's children, a similar process may be followed for the root object's grandchildren, and so on. Once all the pointers in the root object's descendants have been analyzed (and thus, once all reachable objects have been identified), any remaining (i.e., non-marked, non-descendant) objects are considered unreachable, because no pointer that stems from a root object points to those unreachable objects.

In many modern systems, multiple processor threads can work on marking objects as "reachable" in the memory management system simultaneously. However, this can sometimes lead to threads duplicating the previous marking work done by other threads with some marking techniques. For example, if a thread locates a parent object that is itself marked as reachable, that thread may have no way to determine whether the child objects to which that parent object points have themselves been located and marked. For this reason, these marking techniques are sometimes referred to as naïve." In naïve marking techniques, a thread may spend time analyzing all the pointers of a parent object to locate that parent's children, even if those children have already been marked. That is because, in these marking systems, the only way to determine whether a parent's child has been marked is to locate that child in memory. If the child objects have not been marked, the thread could be efficiently used to mark the parent's children. However, if the child object have already been marked by another thread, spending time locating the child objects, only to find them already marked, can waste a significant amount of time. Particularly if the parent object has many children, this can lead to significant inefficiencies.

For example, a first thread may scan a memory, find a reference to a parent object, locate that parent object's memory address, and mark it as "reachable." The first thread may then begin scanning the pointers in that parent object, locating the children's memory addresses, and marking them as "reachable" also. If a second thread is also scanning memory and finds the reference to the parent object after the first thread has marked it as "reachable," the second thread, if using naïve marking techniques, would be unable to determine whether the parent's children are still being marked. This provides the second thread with a choice: it could locate the parent's children and risk duplicating the work that another thread has already done, or skip the children and risk the children remaining unmarked.

To address the issues with naïve marking techniques, some systems utilize tri-color marking techniques when identifying reachable objects for garbage collection. In tri-color marking, an object can fall into three states: (1) unmarked (oftentimes referred to in the industry as "white"), (2) marked with unmarked children (oftentimes referred to in the industry as "grey"), and (3) marked with no unmarked children (oftentimes referred to in the industry as "black"). In tri-color marking, when a thread locates a reference to a "white" object (i.e., an object that has not been marked), it marks the object "grey," then determines whether the object points to unmarked children.

If a grey object does not point to unmarked children, it can then be marked "black." If a grey object does point to unmarked children, a thread can begin to locate them in memory and mark them as well (typically as grey). The grey parent can then be marked "black." In some implementations, a parent may be switched to black only once all children have been marked as grey. In other implementations, a parent may be switched to black earlier in the process (e.g., as soon as the thread begins marking its children).

In tri-color marking techniques, when a thread finds a reference to an object that is marked as black, it can conclude that both that object and all the object's children (if it has any) have been marked, so it can move on and continue scanning the memory for references to other objects. When a thread finds a grey object, on the other hand, it can conclude that the grey object contains pointers to unmarked children, and can begin to locate and mark those children.

For example, a first thread may scan a memory, find a reference to a parent object, locate that parent object's memory address, and mark it as "grey." The first thread may then begin scanning the pointers in that parent object, locating the children's memory addresses, and marking the children grey as well. Once all the children are marked, the first thread could change the parent to "black."

If, in this example, a second thread locates a reference to the parent before the first thread marked it black, that second thread would know that the parent had pointers to unmarked children because the parent is "grey." The second thread could then help the first thread locate and mark those children. If, on the other hand, the second thread located a reference to the parent after the first thread marked it black, the second thread would know that, not only is the parent marked, but the parent's children have been located and marked as well. In this situation, the second thread would conclude that it should not spend time marking the parent, scanning the parent for pointers, or looking for the child objects located at those pointed-to addresses to confirm that they are marked. Without tri-color marking, the second thread would not be able to confidently make this decision.

If, however, the second thread comes upon one of the parent's children in a memory scan after the first thread marked the child "grey," the second thread could conclude that it has been marked by another thread, but that it has pointers to further children (i.e., the original parent's grandchildren) that have not yet been marked. Thus, the second thread could then begin to analyze the pointers within the original child to locate and mark the original parent's grandchildren. Importantly, this could happen at the same time that the first thread is still working to locate and identify the original parent's other children. Thus, by utilizing tri-color marking, the first and second thread are able to efficiently work on the same family tree without risking duplicating each other's efforts.

Unfortunately, tri-color marking techniques are not easily implemented in all memory systems. For example, some systems track occupancy of unmanaged memory space (e.g., heap space) using a memory structure referred to as a bit map. Bit maps typically take the form of a 1-dimensional array of index locations, each of which represents a corresponding region of memory (i.e., a continuous series of bytes in the heap space). These corresponding regions of memory begin particular locations in memory (sometimes referred to as a "memory location" or a "memory address"), and these particular location that corresponds to an index location can be determined based on the index location (e.g., an index location of "4" might be multiplied by 200 to calculate a corresponding memory location of "800," whereas an index location of 25 might be multiplied by 200 to calculate a corresponding memory location of "5,000." The size of a region to which each index location in a bit map corresponds is customizable based on the settings of the memory system. For example, in some systems, each index location may refer to a 2-byte region in unorganized memory space, whereas in other systems, each index may correspond to a 20-byte region in memory.

In a typical bit map, each index location consists of a single bit, which can be turned on (i.e., set to "1") or turned off (i.e., set to "0"). Thus, in a bit map, a single bit can carry information about a much larger region in memory. for example, if each index location corresponds to an 8-byte region in memory, each bit of the bit map actually carries information about 64 bits in memory. Turning these bits on and off can be used to track different information about the corresponding region (e.g., whether the region is occupied, whether the region has been analyzed, whether the region carries frequently used data, or whether the region holds a reachable object). Because this information can be expressed for a relatively large portion of memory in the size of a single bit, bit maps are often preferred due to their low storage requirement.

When typical systems that utilize a bit map perform garbage collection, an object that begins at a memory location is marked by finding the index location in the bit map that corresponds to that memory location and switching the bit at that index location from "0" to "1." However, because each index location can only be either a 0 or a 1, using an index location to mark a corresponding object into one of three states (e.g., "white," "grey," or "black") is difficult. Thus, when a thread sees a reference to a region of memory that has been marked as "1" in a bit map, that thread may be able to conclude that there is a reachable object located at the corresponding location of memory, but the thread may be unable to conclude whether the thread contains any children that have not been marked. In other words, in some systems that utilize a bit map to track memory information, tri-color marking techniques can suffer from the same detriments that naïve marking techniques suffer from.

Some embodiments of the present disclosure implement tri-color marking in systems that utilize a bit map in a way that avoids the detriments of naïve marking systems. In some systems, for example, unorganized memory takes the form of heap space. As previously discussed, each bit in a bit map (in other words, each index location) corresponds to a same-size region of memory. The size of region of memory to which each bit corresponds is referred to herein as the alignment size. For example, if each bit in the bit map corresponds to 4 bytes, the alignment size for the bit map would be 4 bytes. In these systems, if an object is added to memory that is larger than the alignment size (e.g., 4 bytes), the region in which the object is stored would take up more than 1 bit in the bit map. In other words, if an 8-byte object is added to a region of heap space in a system with a 4-byte alignment size, that region would correspond to two bits of the bit map.

Some embodiments of the present disclosure implement tri-color marking by comparing object size and alignment size when marking objects for garbage collection. For example, some embodiments may identify objects that are larger than the alignment size. Because these objects occupy a region in memory that corresponds to at least two index locations in the bit map, at least two bit-map bits could be used to identify whether those objects are considered "white," or have been marked as "black" or "grey."

In some embodiments, for example, if an object occupied a region in heap space that corresponds to two bit-map index locations, the first index location could be used to signify whether the object in that region had been marked. In other words, the first bit could be turned off (i.e., set to "0") to signify that the object is white, and turned on (i.e., set to "1") to signify that the object is either black or grey. In this example, the second index location could be turned off to signify that the object is grey, and turned on to signify that the object is black. Thus, in these embodiments, a set of bits in the bit map that read "00" would signify a white object (e.g., an unmarked object), a set of bits in the bit map that read "10" would signify a grey object (e.g., an object that had been marked, but that contains pointers to unmarked children), and a set of bits that read "11" would signify a black object (e.g., an object that had been marked and either contains no pointers, or contains pointers to marked children). Thus, by identifying objects that are larger than the alignment size, embodiments of the present disclosure effectively identifies objects in the heap space for which tri-color marking is possible, even when using a bit map.

While individually identifying objects that are larger than the alignment size can be a useful way to identify objects for which tri-color marking is possible, tri-color marking using the embodiments of the present disclosure may be particularly beneficial in instances in which all objects in the heap space are larger than the alignment size. In these instances, tri-color marking can be used throughout the heap space, eliminating the inefficiencies of naive marking techniques.

Thus, some embodiments of the present disclosure may attempt to identify whether the minimum object size for a heap space is larger than the alignment size. In heap spaces with a "minimum object size," the heap space is are divided into same-size blocks of contiguous bytes in memory. These same-size blocks are sometimes referred to herein as the minimum object size. For example, a memory system may have a minimum object size of 16 bytes. In this example, the memory would be divided into same-size regions of 16 bytes, and no 16-byte region would contain more than 1 object. Thus, if an object that actually is only 7 bytes in size is stored in the memory, that object may still be allocated one entire 16-byte region. If, on the other hand, a 17-byte object is added to the memory, it may be allocated two adjacent 16-byte regions. For this reason, the "size of an object" in memory may be understood to sometimes refer to as the size of the entire region that is allocated to that object in memory.

Utilizing a minimum object size in a memory system can increase the efficiency of mapping memory locations to index locations in a bit map. However, by identifying a minimum object size that is larger than the alignment size, utilizing a minimum object size can also improve the efficiency of utilizing tri-color marking through the embodiments of the present disclosure. For example, the minimum object size for a heap space may be 8 bytes. If a 6-byte object is added to the heap space, it will still be allocated the minimum object size (8 bytes). If, on the other hand, a 10-byte object is added to the heap space, it will be allocated two regions of the minimum object size (16 bytes).

By comparing the minimum object size to the alignment size, embodiments of the present disclosure can determine whether at least two bits will be available to all objects in the memory. For example, if the minimum object size is at least twice the alignment size, each object in the memory will correspond to at least two bits in the bit map. In these situations, tri-color marking using two bit-map bits can be performed for every object in the memory.

Figure 1:
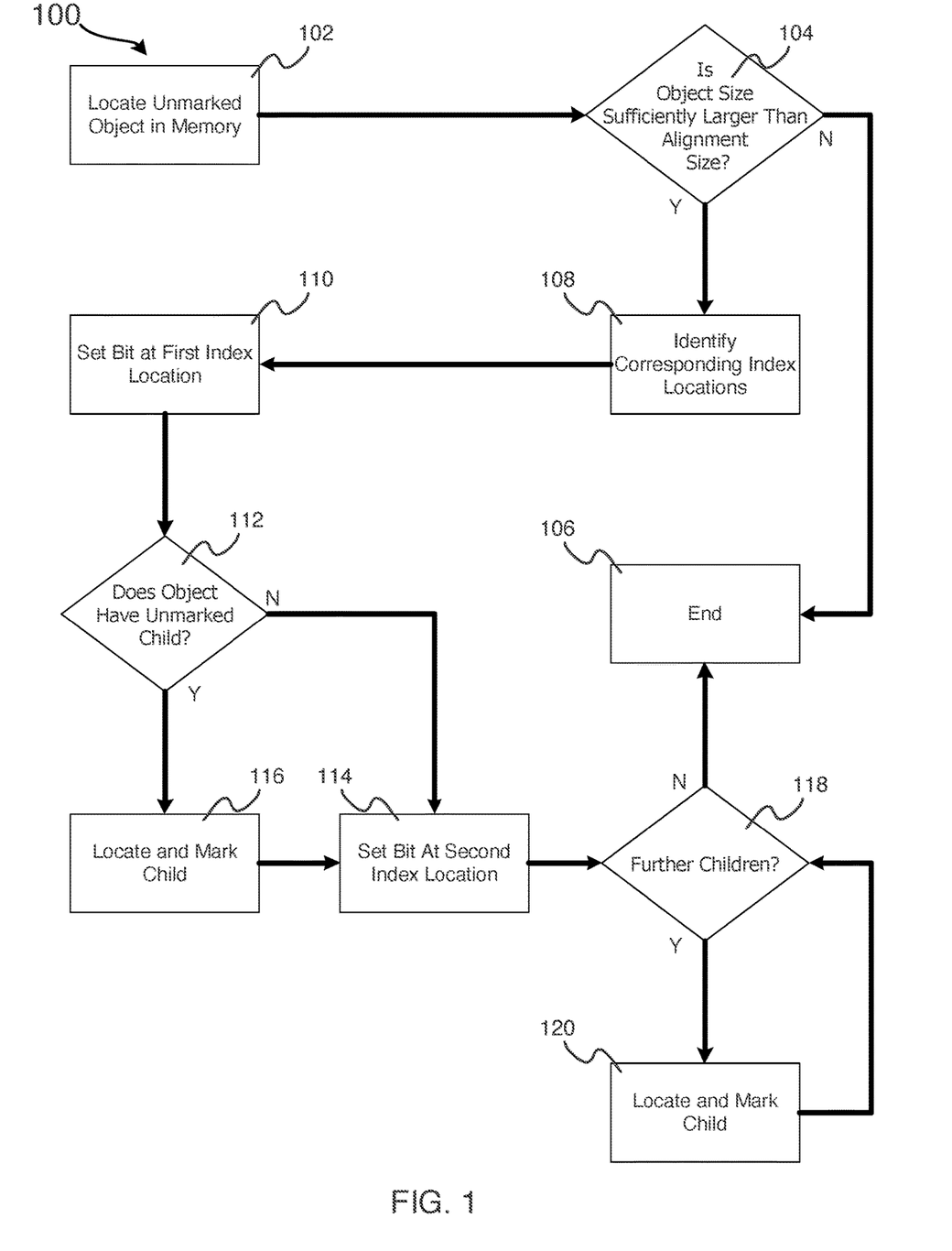
FIG. 1 depicts a method of performing tri-color marking using a bit map, according to embodiments of the present disclosure.

FIG. 1 depicts a method 100 of performing tri-color marking using a bit map, according to embodiments of the present disclosure. Method 100 may be performed, by example, by one or more threads of a storage controller or central processing unit within a larger computer system, such as computer system 401. Method 100 may be performed in a system with an organized memory section (e.g., a memory stack), an unorganized memory section (e.g., a heap space), and a bitmap.

FIG. 1 begins in block 102 in which a thread locates an unmarked object in memory. Block 102 may include identifying the memory location (also referred to as the "memory address") of the unmarked object. In some instances, block 102 could involve the thread first locating the unmarked root object in an organized section of memory, such as a stack space. For example, a thread practicing method 100 could perform block 102 when initially scanning the stack space for root objects at the very beginning of garbage collection. In some instances, on the other hand, block 102 could involve locating an unmarked object in an unorganized section of memory, such as a heap space. For example, a thread practicing method 100 could perform block 102 by following a pointer in a parent object to an unmarked child object.

In block 104, the thread determines whether the size of the unmarked object in memory is sufficiently larger than the alignment size between the bit map and the memory. As previously discussed, each index location in the bitmap (i.e., each bit in the bitmap) corresponds to a same-size region in memory. This size in memory that each bit in the bitmap corresponds to is referred to as the alignment size. If, therefore, the unmarked object takes up less than the alignment size in memory, the unmarked object could be referenced by only 1 bit in the bitmap. For example, each bit in the bitmap may provide information for a 16-byte region in memory. In this example, the alignment size is 16 bytes. If the unmarked object in the memory is only 10 bytes in size, it may be referenced by only 1 bit in the bitmap. If the unmarked object is referenced by only 1 bit in the bitmap, then it would not be convenient to use multiple bitmap bits to express marking information related to that object. However, if the unmarked object is 20 bytes in size, it would require more than 1 bitmap bit to track all the space in memory consumed by that object in the previous example with a 16-bit alignment size. If the unmarked object is referenced by 2 bits in the bitmap, then it would be possible to use multiple bitmap bits to express marking information related to that object.

In some embodiments, block 104 may not only involve determining whether the unmarked object is larger than the alignment size, but may determine how much larger the unmarked object is. For example, it may be beneficial for the unmarked object to be at least twice as large as the alignment size. In this example, an object's size may only be "sufficiently larger" than the alignment size if it is twice as large as the alignment size. This may be beneficial, for example, in memory systems in which the minimum size of objects in memory is small compared to the alignment size. For example, a memory system may specify a 1-byte minimum object size but an 8-byte alignment size. In this example, a 9-byte object in memory would occupy a region that would require 2 bitmap bits to track. However, because the object would only consume 1 byte of the 8-byte region tracked by the second bitmap bit, that region could also contain 7 other 1-byte objects. Thus, using the second bitmap bit to track the marking of the 9-byte object may be misleading in such an example.

However, if block 104 determined whether the object size is at least twice as large as the alignment size, then block 104 could be used to confirm that 2 bitmap bits would be dedicated to tracking the region in memory in which the object is stored, thus could confirm that 2 bitmap bits would be available to mark the object as white, grey, or black. For example, if the alignment size in a system were 4 bytes, block 104 could be used to determine whether the unmarked object is at least 8 bytes in size.

In some embodiments, block 104 could be used not only to determine whether the object itself is sufficiently larger than the alignment size, but could be used to determine whether the region devoted to the object is sufficiently larger. For example, some memory systems may require that all objects be appended with a header that describes the object, or a footer that provides information on the next object in a process. When practicing method 100 on such a memory system, block 104 may take the object headers and footers into account. For example, if the alignment size is 8 bytes, and an object is 8 bytes in size but also has an 8-byte header, block 104 may conclude that the object is twice as large as the alignment size when taking the header into account.

In some embodiments, the determination of block 104 may be performed on a system-wide (or memory-space-wide) basis. In other words, a thread in block 104 may not determine whether a particular object is sufficiently larger than the alignment size, but rather whether the minimum object size for the memory space is sufficiently larger than the alignment size. For example, if the object is located in heap space, a thread performing block 104 may determine whether the minimum object size is sufficiently larger than (e.g., twice as large as) the alignment size. In these embodiments, block 104 may be performed before block 102, and even before a garbage-collection process, or the marking for the garbage-collection process, is initiated. Rather, block 104 may be performed, in these embodiments, as a preliminary measure, and stored as a system configuration.

If a thread determines in block 104 that an object size (e.g., the memory region allocated to an object, including headers, footers, etc.) is not sufficiently larger than the alignment size, then the thread concludes that multiple bitmap bits should not be used to perform tri-color marking of the object, and method 100 ends in block 106. However, if the thread determines that the object size is sufficiently larger than the alignment size, then the thread proceeds to block 108 in which the thread identifies the corresponding index location (or locations) for the unmarked object.

In block 108, a thread may perform a calculation by which the memory address of the unmarked object (which may, for example, have been identified in block 102) can be converted to a bitmap index location. For example, a thread may divide the memory address by a pre-determined integer (e.g., by 100) and then subtract another pre-determined integer (e.g., 200) from the resulting quotient. The result of this calculation may identify the index location that corresponds to the memory address of the memory region at which the unmarked object is stored.

In some embodiments, block 108 may involve identifying multiple index locations. The number of index locations calculated may depend on the size of the unmarked object with respect to the alignment size. For example, if the size of the unmarked object is four times as large as the alignment size, the total region in which the unmarked object is stored would correspond to four bits in the bitmap. In this example, a thread performing block 108 may detect that multiple bit-map bits correspond to the unmarked object, and may identify all such bitmap bits. In some embodiments, a thread may only identify two of the bits of the bitmap, even if more than two correspond to the unmarked object. For example, if the region occupied by an unmarked object corresponds to 10 bitmap bits, a thread may only identify the first two index locations (for example, the two index locations that correspond to the smallest memory addresses occupied by the object) or the last two index locations (for example, the two index locations that correspond to the largest memory addresses occupied by the object).

Once a thread identifies the index locations that correspond to the memory locations of the unmarked object, the thread proceeds, in block 110, to set the bit in the "first" of those index locations. In other words, the thread switches a bit in the first index location from "0" to "1." By setting the first bit to 1, the thread records the fact that the unmarked object that was located in block 102 is now "marked," and is considered either "grey" or "black." This marking informs a garbage-collecting system that there is a reachable object located at the memory address that corresponds to that first index location, and, therefore, that that object should not be deleted.

Determining what the "first" index location is in block 110 may depend on other configurations of the system. In some embodiments, for example, the first index location may depend on the direction in which threads are programmed to scan the bitmap for unmarked objects. While it is not essential, it may be beneficial for the "first" index location to be the index location that the threads first encounter out of the index locations identified in block 108 when the threads are scanning the bitmap. If the threads are programmed to scan the bitmap in an ascending direction (i.e., beginning at index locations corresponding to small memory addresses and proceeding towards index locations corresponding to large memory addresses), the "first" index location may be the index location that corresponds to the smallest memory address occupied by the unmarked object. However, if the threads are programmed to scan the bitmap in a descending direction, the "first" index location may be the index location that corresponds to the largest memory address occupied by the unmarked object. In some embodiments, even if there are more than two corresponding index locations identified at block 108, the "first" index location may always be one of the two index locations that corresponds to the two smallest or two largest memory addresses occupied by the unmarked object. In these embodiments, the "first" index location of these two index locations may still be determined by the scan direction of the threads. In other words, if the threads are programmed to scan the bitmap in a descending direction, and four index locations are identified in block 108, block 110 may set the second-lowest index location (i.e., the index location corresponding to the second-lowest memory address occupied by the unmarked object) as the first bit. This is because, of the two lowest index locations, the second-lowest index location would be analyzed first by a thread scanning the bitmap in a descending direction.

Once the bit at the first identified index location is set in block 110, the "unmarked" object can be considered marked "grey." This signifies that the object itself has been located and marked, but the object may have unmarked children. Thus, after marking the object grey in block 110, a thread would proceed to determine, in block 112, whether the object has at least one unmarked child. For example, the thread could analyze the content of the object in memory to determine whether the object contains any pointers to other objects (i.e., children). In most instances, if an object that was unmarked immediately previously has children, those children will be unmarked. Thus, in most instances, a thread could safely assume in block 112 that, if the grey object has pointers to children, those children are unmarked.

If the thread determines, in block 112, that the grey object does not have any unmarked children, the thread can then set the bit at the second identified index location in block 114. This second index location should be among the index locations that were identified in block 108 as corresponding to the memory region in which the object is stored. Once the bit at the second location is set, the "grey" object can be considered "black." This signifies that the object has been located and marked as "reachable," and that the object has no children that have not been located and marked as "reachable."

The "second index location" in block 114 may be adjacent to the first index location. This may be beneficial because it would only require two adjacent bits in the bitmap to be used for tri-color marking. For example, if a thread were scanning the bitmap for objects, the thread may discover that a bit has been set in a first index location. The thread would be able to conclude that a reachable object is stored in memory at a memory address that corresponds to that first index location. By scanning the next, adjacent bit, the thread would also be able to conclude whether that object had any unmarked children.

Whether the chosen second index location is higher in the bitmap (i.e., corresponding to a larger memory address) or lower in the bitmap may be determined, as discussed in connection with block 110, based on the scan location of threads in the system. If, for example, threads are programmed to scan the bitmap in an ascending direction (i.e., from index locations that correspond to low memory addresses to index locations that correspond to high memory addresses), it may be beneficial to select a higher index location.

If a thread determines, in block 112, that the object does have at least one unmarked child, the thread proceeds to follow the pointer in the grey object to the child to locate that child in memory in block 116. Locating a child in memory may vary based on the specifics of the system and the content of the pointer, but typically a child is located by using the information in the pointer to determine the memory address of the child. Once the memory address of the child is located, the thread can also identify the corresponding index location in the bitmap of that memory address. Once the corresponding index location for the child's memory address is identified, the thread can set a bit at that index location, indicating that the child has been located and marked. This would indicate to other threads that a reachable object is stored at the memory location that corresponds to that index location.

After the child is located and marked in block 116, the thread proceeds to block 114 to set the bit at the second index location for the parent object (i.e., the object located in block 102). The thread then determines whether the parent object contains pointers to any other children in block 118. If the parent does have further children, the thread proceeds to locate and mark the next child in block 120. This location and marking may be similar to the location and marking of block 116. After the next child has been located and marked in block 120, the thread returns to block 118 to again determine whether there are further children. If the thread determines, in block 118, that the parent object (i.e., the object located in block 102) has no further pointers to child objects, the thread ends method 100 in block 106.

FIG. 1 illustrates one potential order of operations for method 100, but in some other embodiments, the precise timing and order of operations may differ from those previously discussed. For example, in some embodiments, the precise timing of setting the second bit for the parent in block 114 may depend on the system configuration, the number of children pointed to by the parent, and the proximity of the child and parent objects.

For example, in some embodiments the bit at the second index location may not be set in block 114 until a threshold percentage of the children of the parent object have been marked as "grey" (for example, through blocks 116, 118 and 120). This may be beneficial if the parent has a lot of children, because setting the second bit in block 114 may signify to other threads scanning the bitmap that all children of the parent location have been marked. This may be useful for avoiding duplication of efforts, but may prevent other threads from assisting to mark the parent's children in instances in which the parent has a very large number of children. In these instances, the potential for some duplication of efforts may justify the performance benefits of multiple threads working on locating and marking the large number of children. Thus, for parent objects with a number of children above a threshold (e.g., 50), a thread may not set the bit at the second index location in block 114 until a threshold number of the parent's children have been marked. For example, if the parent (i.e., the object marked in block 102) has 100 children, the threshold may be set at 50% (i.e., 49 iterations of blocks 118 and 120 plus one iteration of block 116).

In some instances, on the other hand, the thread may attempt to set the second bit in block 114 as soon in the child-marking process as it is convenient to do so. When it is "convenient" to set the second bit in block 114 may depend on the proximity of the parent object (i.e., the object located in block 102) and the child object. For example, if the child object located and marked in block 116 is near the parent object in the bit map, the second bit of the parent and the first bit of the child could be marked at the same time (for example, in the same "compare and swap" instruction). However, if the child object located and marked in block 116 is not near the parent object, the thread may delay setting the second bit in block 114 until a child that is in close proximity to the parent is located in iterations of blocks 118 and block 120. For example, the thread may proceed directly from block 116 to block 118 and block 120. If the child located in the first iteration of block 118 and block 120 is located near the parent object, the thread may mark that child and set the second bit in block 114 at the same time. Otherwise, the thread may again delay block 114 and perform further iterations of blocks 118 and 120. While this practice may prevent excess instructions to set bits in the bit map, delaying setting the bit at the second index location in block 114 may increase the chance that another thread would find the parent object in a bitmap scan, conclude that it is grey, and duplicate efforts by scanning the parent's children (for example, by performing blocks 116, 118, and 120. Thus, a thread programmed to delay block 114 in this manner may also be programmed to perform block 114 after a threshold number of iterations of blocks 118 and 120 have been performed (e.g., 20 iterations).

In some instances, it may be beneficial for a thread to set the second bit at the second index location in block 114 as soon as possible. Setting the bit at the second index location effectively marks the parent object "black," which would signify to a thread that all children of the parent object have been marked. This would, in turn, signify that the thread could skip analyzing the parent for pointers, and move to scanning the bitmap for other objects. This may minimize the risk that another thread would locate the parent object in a bitmap scan and begin attempting to locate and mark children that have already been marked and located by another thread.

Figure 2A:
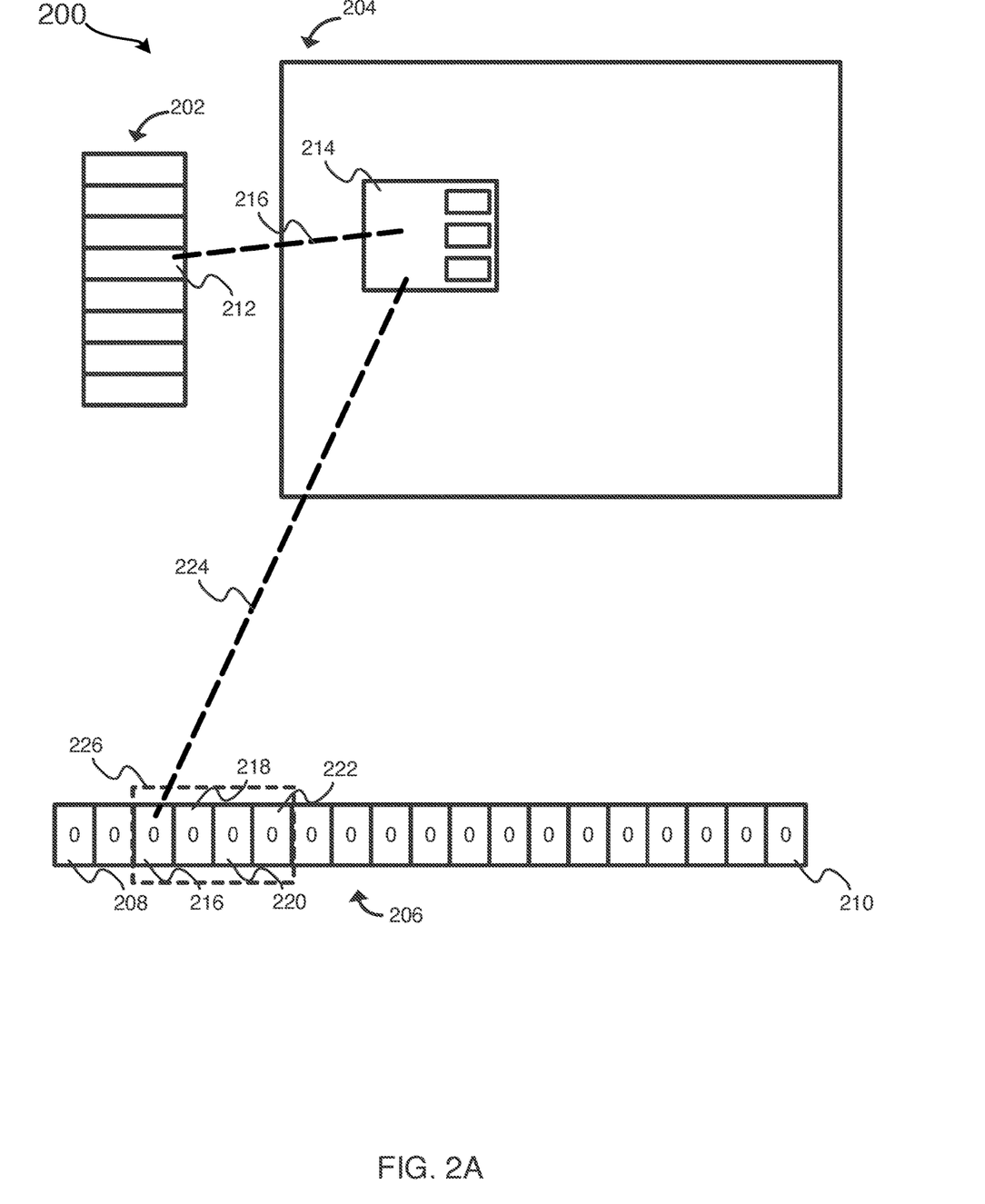
FIG. 2A depicts an initial abstraction of a memory system with a bit map in which tri-color marking could be performed in accordance with embodiments of the present disclosure.
Figure 2B:
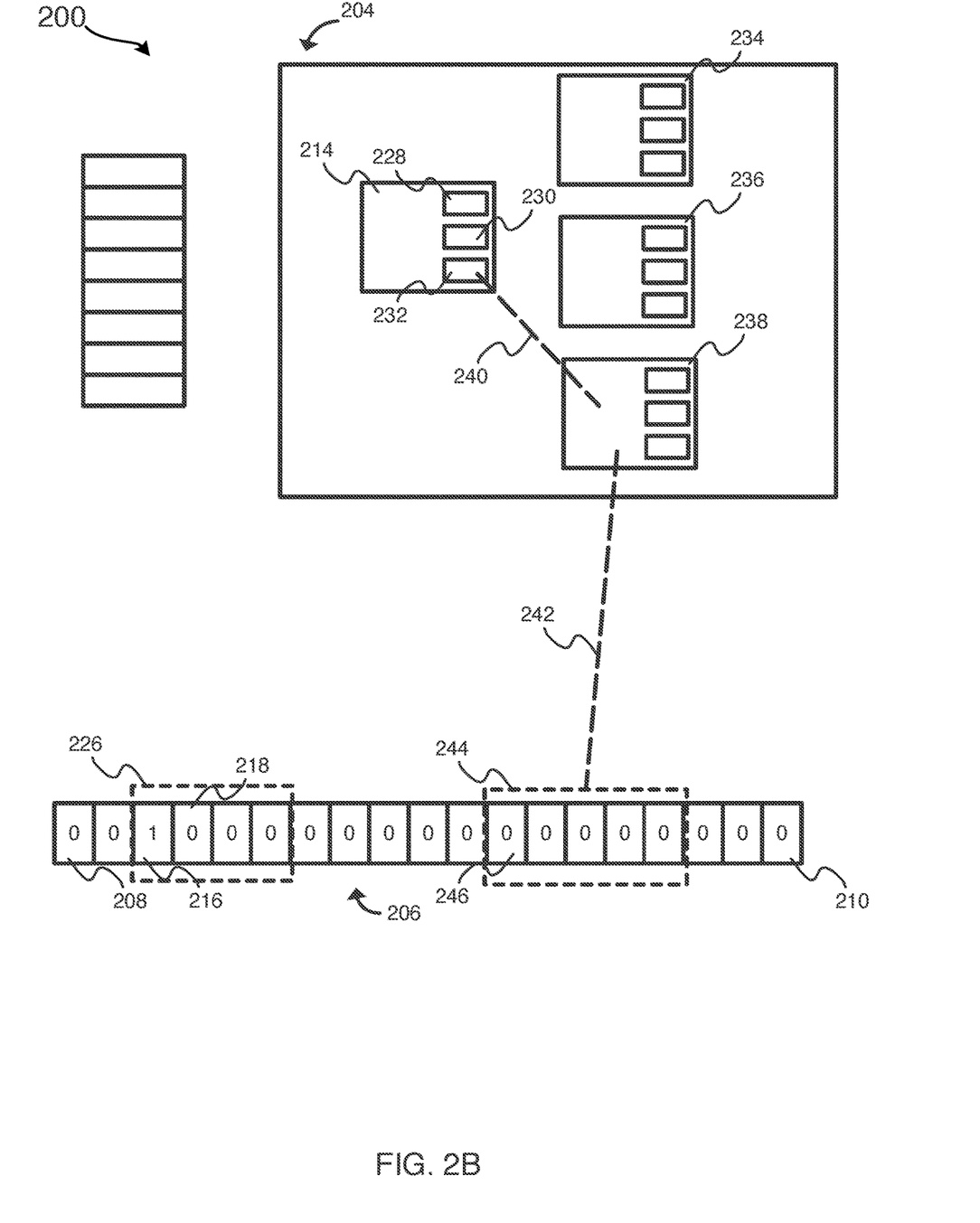
FIG. 2B depicts a second abstraction of a memory system with a bit map in which tri-color marking could be performed in accordance with embodiments of the present disclosure.
Figure 2C:
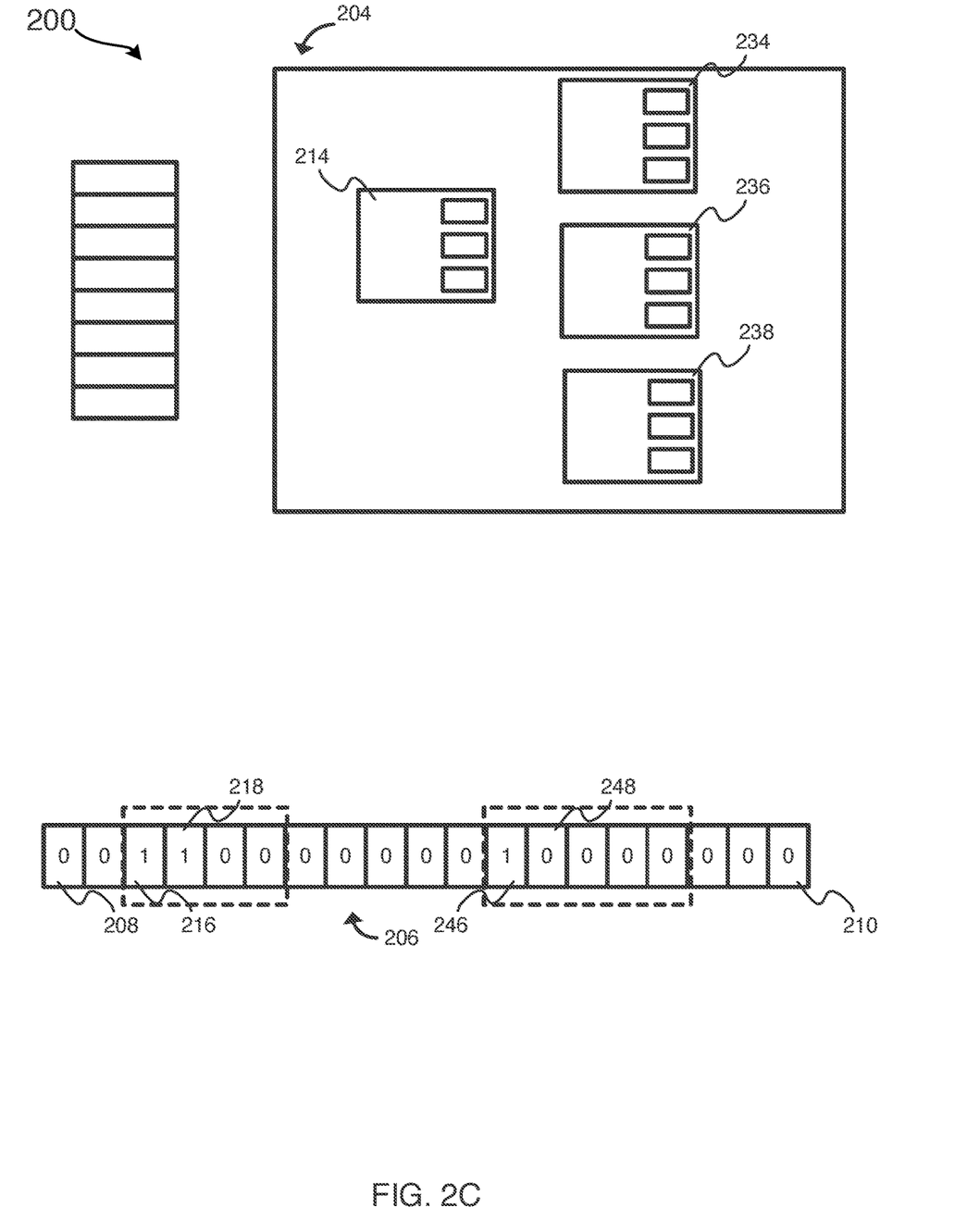
FIG. 2C depicts a third abstraction of a memory system with a bit map in which tri-color marking could be performed in accordance with embodiments of the present disclosure.

For the sake of understanding, FIGS. 2A-2C depict an abstraction of a memory system 200 in which tri-color marking may be used in a bitmap, according to embodiments of the present disclosure. FIG. 2A depicts a first view of memory system 200, before any objects are marked as reachable.

Memory system 200 includes stack space 202, an organized, orderly portion of memory that is significantly managed by a computer processing unit (CPU) of the system. Memory system 200 also contains heap space 204, a larger, less organized section memory in which most resource objects for the system may be stored. The contents of heap space 204 may be mapped by bitmap 206, a one-dimensional matrix of index locations, each of which contains a single bit. Index locations 208 and 210 represent the bits in bitmap 206 that, respectively, correspond to the largest and smallest memory addresses in heap space 204. While bitmap 206 is presented as only containing 19 index locations for the ease of understanding, in practice bitmaps may contain a far larger number of index locations depending on the size of the heap space they track.

Stack space 202 contains root object 212. When a thread begins performing tri-color marking in memory system 200, it may analyze root object 212 and discover a pointer to a child object (object 214). Analyzing that pointer may provide a thread with the location in memory (i.e., the memory address) of that object 214 in heap space 204. This analysis is represented by dashed line 216. With the memory address of child 214, a thread could identify the index locations (index locations 216-222) in the bitmap that corresponds to the memory address of the region of heap space 204 in which object 214 is stored. This identification is represented by dashed line 224, and the region of the bitmap that encompasses these index locations is illustrated by dashed box 226.

FIG. 2B depicts the next view of memory system 200. In FIG. 2B, a thread has set the bit in index location 216, indicating that a reachable object (object 214) exists at the memory address that corresponds to index location 216. The thread may have chosen index location 216 rather than any of the other bits in bitmap region 226 because the threads in memory system 200 may be programmed to scan the bitmap for objects in an ascending direction (i.e., from index location 208 towards index location 210). Because index location 216 is the first index location within region 226 that such a thread scanning bitmap 206 would encounter. Therefore, a set bit in index location 216 may indicate to a thread that the object corresponding to that index location (object 214) has been marked "grey," but a set bit in a subsequent index location for that object (e.g., index location 218) may indicate that the object has been marked "black."

Upon setting the bit in index location 216, the thread may analyze object 214 and discover that it has three pointers 228, 230, and 232 to child objects 234, 236, and 238. By analyzing one of those pointers, the thread could determine the location of one of the child objects in memory. Dashed line 240, as an example, depicts the analysis by which a thread could analyze pointer 232 and determine the memory address of child object 238.

Upon determining the memory address of child object 238, the thread would then be able to identify the corresponding index locations in bitmap 206 that correspond to the region of memory occupied by child object 238. This identification is depicted by dashed line 242, indicating region 244 of bitmap 206 in which the index locations that correspond to the memory region in which child object 238 is located. Index location 246, the "lowest" of those index locations, would be scanned by a thread scanning the bitmap in an ascending direction.

FIG. 2C depicts the next view of memory system 200. In FIG. 2C, the thread that identified the index locations that correspond to child object 238 has set the bit in index location 246. This, in effect, marks child object 238 as "grey," signifying to other threads scanning the bitmap that a reachable object occupies the memory region associated with index location 246. As illustrated in FIG. 2C, the thread that identified the index locations that correspond to child object 238 has also set the bit in index location 218.

The bits in 216 and 218 being adjacent to each other and both being set would signify to other threads scanning the bitmap that a reachable object occupies the memory region associated with index locations 216 and 218, and also that the children of the reachable object do not need to be located and marked. In other words, setting the bit in index location 218 effectively changes the marking of object 214 from "grey" to "black." In some embodiments, the bit in index location 218 may have been set when object 214's first child was marked. This would prevent any other threads from helping to locate and mark the remaining of object 214's children (e.g., child objects 234 and 236), but would also help to prevent duplicated efforts (e.g., other threads attempting to locate and mark child object 238 after it had already been marked). In some embodiments, the bit in index location 218 may have been set when object 214's last child was marked. This would increase the chances of another thread assisting to locate and mark the remaining of object 214's children, but would also increase the chances of duplicated efforts. In some embodiments, the bit in index location 218 may have been set after a threshold number of object 214's children have been marked, or at the same time as a child object that could be marked on the same compare-and-swap instruction as index location 218.

Once a thread has located and marked all the child objects pointed to by object 214, it may continue scanning bitmap 206 for grey objects. Upon locating a grey object, the thread may locate that object in the heap space and begin following its pointers to locate and mark it's children.

As it is illustrated in FIG. 2C, a thread scanning bitmap 206 in an ascending direction (e.g., starting at index location 208 and scanning towards 210) may first discover the set bit in index location 216. If the threads in memory system are programmed to set the bit in the "lowest" index location when marking an object grey, a thread could assume, upon detecting the set bit in index location 216, that a reachable object (i.e., object 214) is located in the heap-space region that corresponds to index location 216, and that that reachable object has been marked "grey." However, the thread would not immediately know whether object 214's children have been located and marked. By scanning the next index location, index location 218, the thread would be able to infer (especially in a system in which the minimum object size is larger than the alignment size), however, that object 214 had been marked "black." This would signify that all children of object 214 either have been marked or are in the process of being marked. Thus, the thread could conclude that there was no need to locate object 214 in heap space or follow the object 214's pointers to locate and mark its children.

Upon realizing that object 214 had been marked "black," the thread could continue scanning bitmap 206 until it detected the set bit in index location 246. This, similar to the set bit in index location 216, would again signify to the thread that a reachable object (i.e., child object 238) at a corresponding heap-space location had been marked "grey." However, by scanning the next index location (index location 248) and detecting that the bit therein had not been set, the thread could conclude that child object 238 had not yet been marked "black." This would signify that child object 238 may still have some reachable children that require locating and marking, and thus the thread may locate child object 238 in the heap space to begin analyzing it for pointers.

As previously discussed, a first thread may have set the bit in index location 218 while it was still locating and marking object 214's children. Thus, a second thread could detect that object 214 had been marked "black," continue scanning based on that detection, and then detect that child object 238 had been marked "grey" but not yet "black." Thus, the second thread could begin locating and marking the children of child object 238 (object 214's grandchildren) while the first thread was still locating and marking child objects 234 and 236. In this way, tri-color marking could be utilized in memory system 200 to benefit from the efficiencies of multiple threads while reducing the potential for duplicated efforts.

Figure 3:
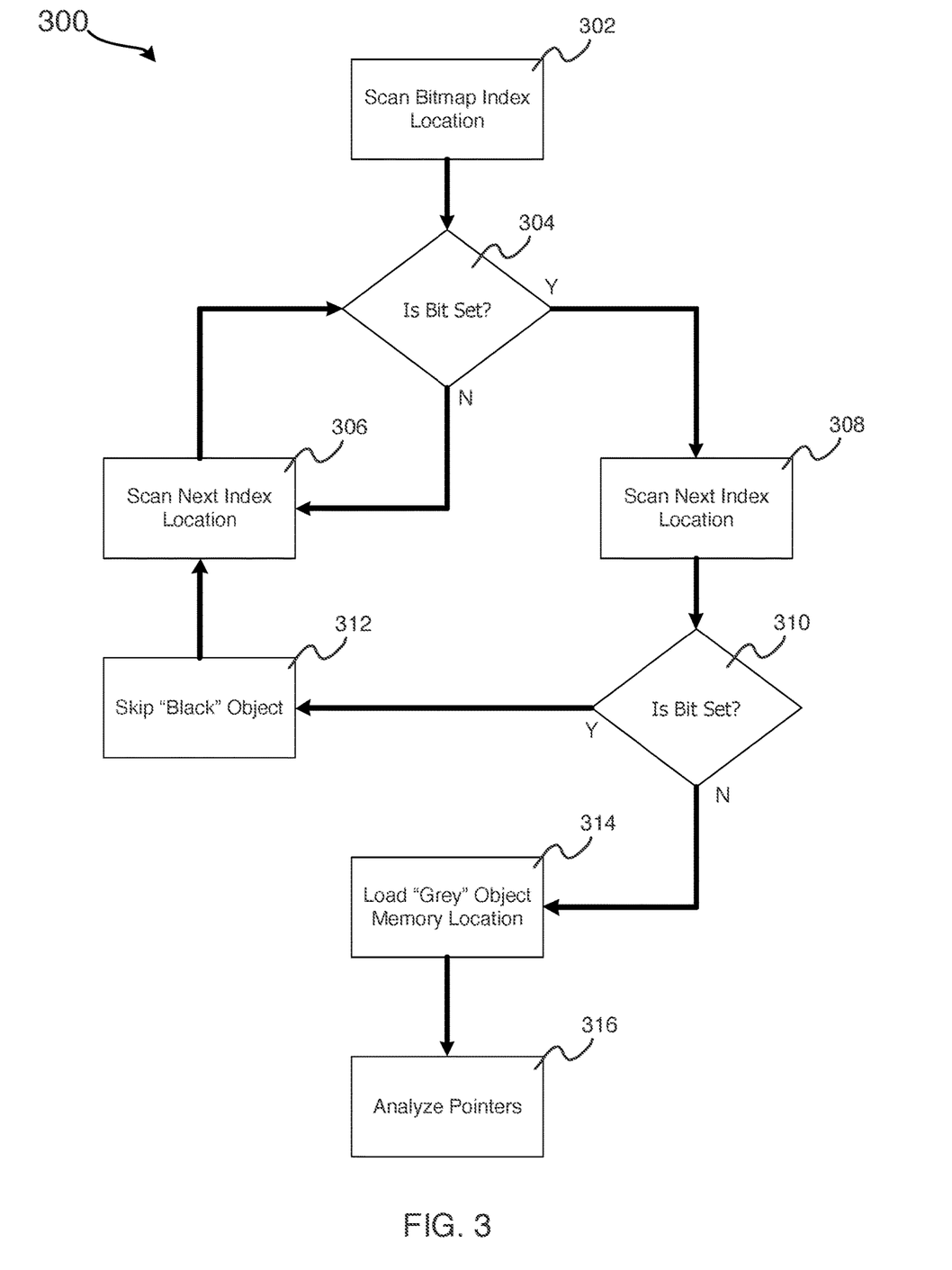
FIG. 3 depicts a method of scanning a bit map for reachable objects, in accordance with embodiments of the present disclosure.

FIG. 3 depicts a method 300 of scanning a bit map for reachable objects. Method 300 further illustrates the manner in which the tri-color marking system of the present disclosure could be utilized by a thread that is identifying reachable objects for garbage collection. For example, method 300 may be performed by the "second thread" that was discussed in connection with FIG. 2C.

Method 300 begins in block 302, in which the thread scans an index location. In some instances, this may be the first index location in the bitmap, or it may be a subsequent index location. In some embodiments, the thread may be scanning the bitmap in an ascending direction, whereas in other embodiments, the thread may be scanning the bitmap in a descending direction. In block 304, the thread determines whether the bit at the index location scanned in block 302 (referred to herein as the "first" index location) is set (i.e., is set to "1"). If the thread determines that the bit is not set, the thread may conclude that no object that is stored in memory at a location corresponding to the first index location has been marked as "reachable." The thread may then proceed to scan the next index location in the bitmap (referred to herein as the "second" index location) in block 306. The thread then returns to block 304 to determine whether the bit at that second index location is set.

If the thread determines, in block 304, that a bit at an index location is set (for example at the second index location), the thread can conclude that a reachable object is located at a memory address corresponding to that index location. This would signify to the thread that the object had been marked "grey," but the thread would not be able to determine, based on that index location (e.g., the second index location) alone, whether the object had been marked "black." Thus, the thread would then proceed to scan the next index location in the bitmap (referred to herein as the "third") index location) in block 308.

The thread then determines, in block 310, whether the bit at that next index location (e.g., the third index location) is set. If the thread determines that the bit is set, the thread can conclude that the object had been marked "black" because the bits at the two preceding index locations (e.g., the second and third index locations) were set. This would signify to the thread that the children of the marked object either had been located and marked, or that a sufficient number of the children had been marked that assistance was no longer needed with the children. Thus, the thread may skip the black object in block 312 and proceed to scan the next index location in block 306.

If, on the other hand, thread determines in block 310 that the bit is not set, it can conclude that the object had been marked "grey" because only one of the two preceding index locations (e.g., the second and third index locations) exhibited a set bit. This would signify to the thread that the children of the marked object had not been marked, or that the number of children who had been marked is small enough that assistance in locating and marking the remaining children would be beneficial. Thus, the thread would then proceed to load the "grey" object from memory in block 314 and analyze the pointers within the object in block 316 to locate and mark its children. In this way, multiple threads could be used to locate and mark reachable objects in memory without accepting an undesirable risk of duplicating efforts.

Figure 4:
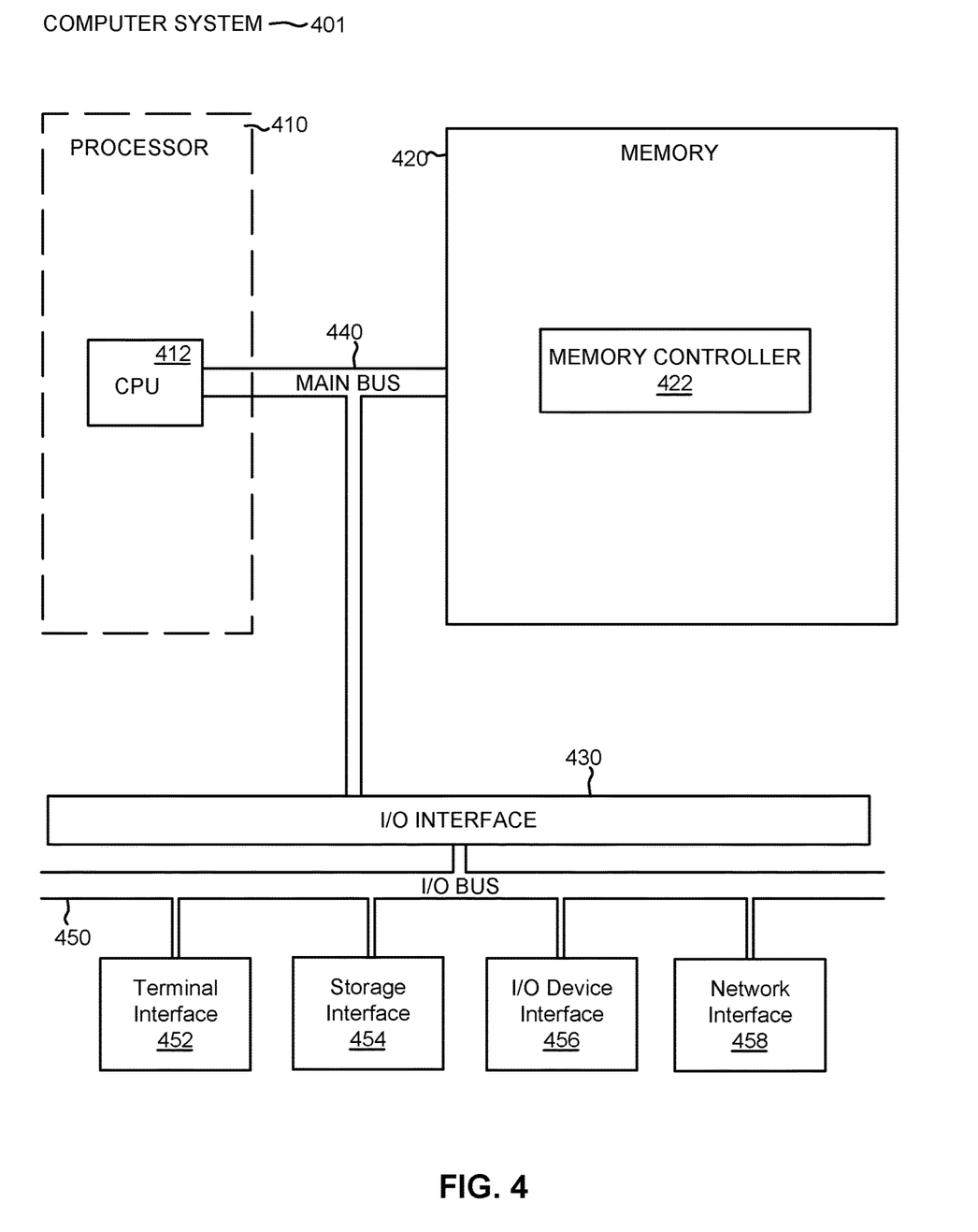
FIG. 4 depicts the representative major components of a computer system that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying a first object at a first memory address;
   calculating a first index location in a bitmap, wherein the first index location corresponds to the first memory address;
   setting a first bit at the first index location;
   detecting a pointer to a child object within the first object;
   identifying, using the pointer, a second memory address of the child object;
   calculating a second index location in the bitmap, wherein the second index location corresponds to the second memory address;
   setting a second bit at the second index location; and
   setting a third bit at a third index location, wherein the third index location is adjacent to the first index location.

2. The method of claim 1, wherein setting the first bit signifies that the first object has been marked "grey," and wherein setting the third bit signifies that a root object has been marked "black".

3. The method of claim 1, further determining to set the third bit upon setting the second bit.

4. The method of claim 3, wherein the third bit is set with a same compare-and-swap instruction with which the second bit is set.

5. The method of claim 3, wherein determining to set the third bit upon setting the second bit is based on detecting that a number of children pointed to by the first object is below a threshold.

6. The method of claim 1, wherein the third bit is set upon detecting that all children of the first object have been located and marked "grey".

7. The method of claim 1, wherein the third bit is set upon detecting that a threshold percentage of the children of the first object have been marked "grey".

8. The method of claim 1, further comprising determining that an object size of the first object is larger than an alignment size for the bitmap.

9. The method of claim 1, further comprising:
   scanning the first index location;
   detecting that the first bit is set;
   concluding, based on detecting that the first bit is set, that a first reachable object at the first memory address has been marked "grey";
   scanning the third index location;
   detecting that the third bit is set; and
   concluding, based on detecting that the third bit is set, that the first reachable object at the first memory address has been marked "black".

10. The method of claim 9, further comprising:
    scanning the second index location;
    detecting that the second bit is set;
    concluding, based on detecting that the second bit is set, that a second reachable object at the second memory address has been marked "grey";
    scanning a fourth index location, wherein the fourth index location is adjacent to the second index location;
    detecting that a fourth bit at the fourth index location is set; and
    concluding, based on detecting that the fourth bit is set, that the second reachable object at the second memory address has not been marked "black".

11. A system comprising:
    a processor; and
    a memory in communication with the processor, the memory containing program instructions that, when executed by the processor, are configured to cause the processor to perform a method, the method comprising:
       identifying a first object at a first memory address;
       calculating a first index location in a bitmap, wherein the first index location corresponds to the first memory address;
       setting a first bit at the first index location;
       detecting a pointer to a child object within the first object;
       identifying, using the pointer, a second memory address of the child object;
       calculating a second index location in the bitmap, wherein the second index location corresponds to the second memory address;
       setting a second bit at the second index location; and
       setting a third bit at a third index location, wherein the third index location is adjacent to the first index location.

12. The system of claim 11, wherein the method further comprises further determining to set the third bit upon setting the second bit.

13. The system of claim 12, wherein determining to set the third bit upon setting the second bit is based on detecting that a number of children pointed to by the first object is below a threshold.

14. The system of claim 11, wherein the third bit is set upon detecting that a threshold percentage of the children of the first object have been marked "grey".

15. The system of claim 11, wherein the method further comprises:
    scanning the first index location;
    detecting that the first bit is set;
    concluding, based on detecting that the first bit is set, that a first reachable object at the first memory address has been marked "grey";
    scanning the third index location;

detecting that the third bit is set; and concluding, based on detecting that the third bit is set, that the first reachable object at the first memory address has been marked "black".

16. The system of claim 15, wherein the method further comprises:
    scanning the second index location;
    detecting that the second bit is set;
    concluding, based on detecting that the second bit is set, that a second reachable object at the second memory address has been marked "grey";
    scanning a fourth index location, wherein the fourth index location is adjacent to the second index location;
    detecting that a fourth bit at the fourth index location is set; and
    concluding, based on detecting that the fourth bit is set, that the second reachable object at the second memory address has not been marked "black".

17. A computer program product, the computer program product comprising a computer readable storage medium having program instructions embodied therewith, the program instructions executable by a computer to cause the computer to:
    identify a first object at a first memory address;
    calculate a first index location in a bitmap, wherein the first index location corresponds to the first memory address;
    set a first bit at the first index location;
    detect a pointer to a child object within the first object;
    identify, using the pointer, a second memory address of the child object;
    calculate a second index location in the bitmap, wherein the second index location corresponds to the second memory address;
    set a second bit at the second index location; and
    set a third bit at a third index location, wherein the third index location is adjacent to the first index location.

18. The computer program product of claim 17, wherein the third bit is set upon detecting that a threshold percentage of the children of the first object have been marked "grey".

19. The computer program product of claim 17, wherein the program instructions further cause the computer to:
    scan the first index location;
    detect that the first bit is set;
    conclude, based on detecting that the first bit is set, that a first reachable object at the first memory address has been marked "grey";
    scan the third index location;
    detect that the third bit is set; and
    conclude, based on detecting that the third bit is set, that the first reachable object at the first memory address has been marked "black".

20. The computer program product of claim 19, wherein the program instructions further cause the computer to:
    scan the second index location;
    detect that the second bit is set;
    conclude, based on detecting that the second bit is set, that a second reachable object at the second memory address has been marked "grey";
    scan a fourth index location, wherein the fourth index location is adjacent to the second index location;
    detect that a fourth bit at the fourth index location is set; and
    conclude, based on detecting that the fourth bit is set, that the second reachable object at the second memory address has not been marked "black".

\* \* \* \* \*